United States Patent [19] [11] 4,306,314
Griffiths [45] Dec. 15, 1981

[54] EQUIPMENT CONTROL SYSTEM WITH FIBER OPTIC COUPLED REMOTE CONTROL

[76] Inventor: Edward E. Griffiths, 6499 Trinidad Ave., San Jose, Calif. 95120

[21] Appl. No.: 183,020

[22] Filed: Sep. 2, 1980

Related U.S. Application Data

[63] Continuation-in-part of Ser. No. 89,540, Oct. 29, 1979, abandoned.

[51] Int. Cl.[3] .......... H04B 9/00

[52] U.S. Cl. .......... 455/603; 251/131; 455/610; 455/612; 340/825

[58] Field of Search .......... 179/82; 251/131; 455/603, 612, 610, 39, 41, 99, 91, 100, 117; 340/147 R, 573, 575, 576

[56] References Cited

U.S. PATENT DOCUMENTS

| | | | |
|---|---|---|---|
| 907,488 | 12/1908 | Gabet | 455/603 |
| 1,098,379 | 6/1914 | Hammond | 455/603 |
| 2,188,293 | 1/1940 | Williams | 455/603 |
| 3,177,481 | 4/1965 | Joy | 340/573 |
| 3,820,070 | 6/1974 | Fox | 340/147 R |
| 3,943,357 | 3/1976 | Culver | 455/610 |
| 3,963,051 | 6/1976 | Kuhlman | 137/637 |
| 3,974,879 | 8/1976 | Nelson | 251/131 |

FOREIGN PATENT DOCUMENTS

| | | | |
|---|---|---|---|
| 1383442 | 2/1975 | United Kingdom | 179/82 |

*Primary Examiner*—Howard Britton
*Attorney, Agent, or Firm*—Linval B. Castle

[57] ABSTRACT

Hydraulically operated equipment, e.g., cranes or the like, may be accurately controlled by a remote control coupled by a fiber optic link to hydraulic valve control servo circuitry at the equipment site. Analog input voltage levels representing various functions and/or motor positions are pulse position modulated for transmission through the fiber optic link, and are reconverted into analog signals for controlling selected motors and valve actuating solenoids. Novel safety features are incorporated for stopping and delaying all control if a deadman switch is released or if a function is incorrectly selected, and a standby power pack automatically neutralizes all motors and functions in the event of failure of the main power source.

9 Claims, 6 Drawing Figures

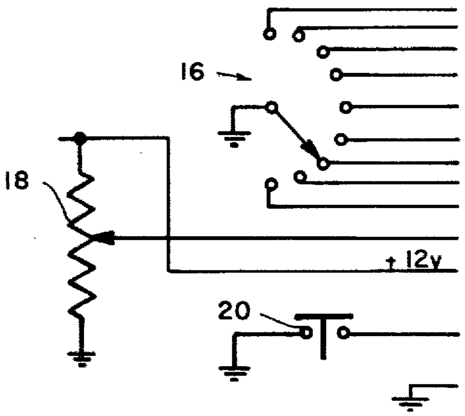
FIG. 2
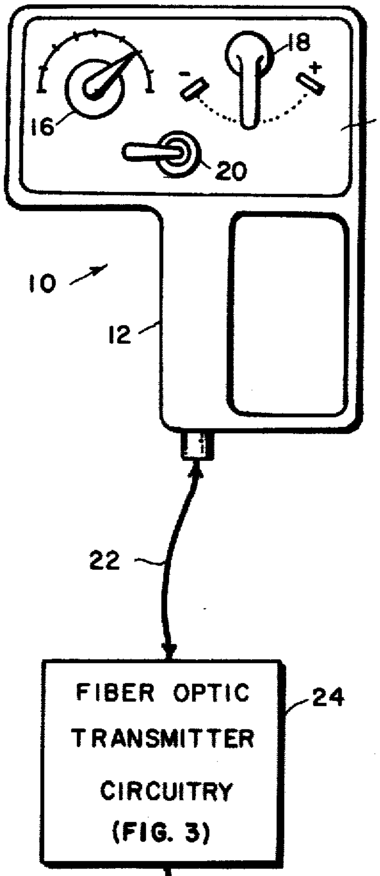
FIG. 1
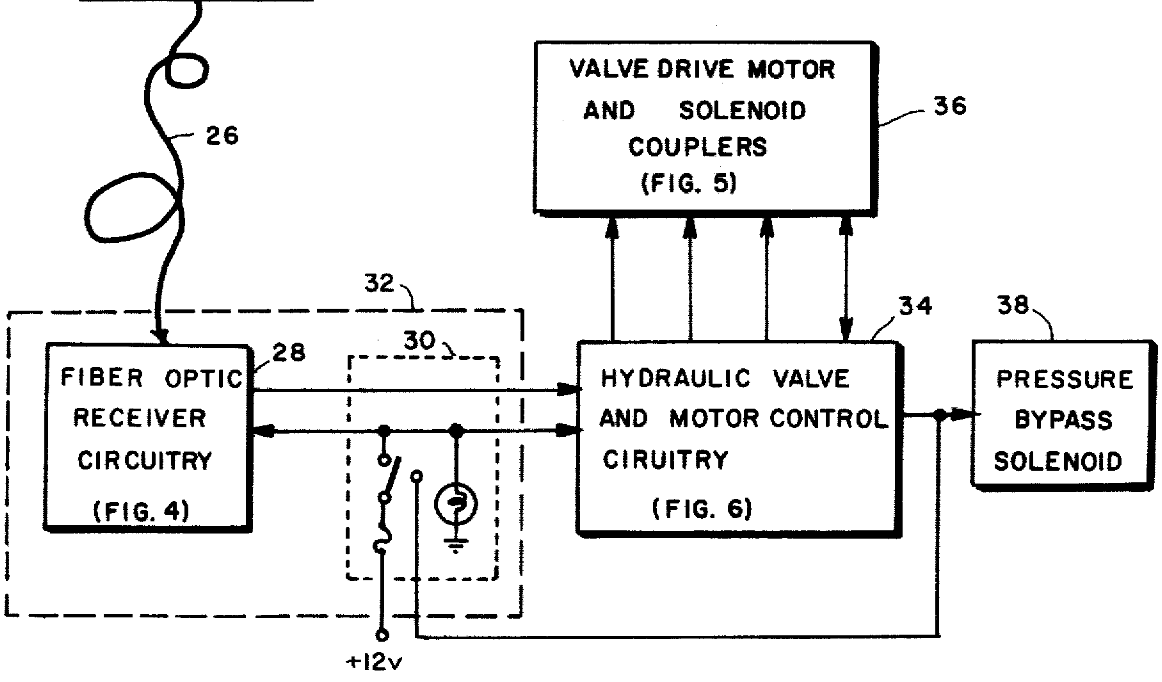

EQUIPMENT CONTROL SYSTEM WITH FIBER OPTIC COUPLED REMOTE CONTROL

This is a continuation-in-part of my copending patent application, Ser. No. 089,540, filed Oct. 29, 1979, now abandoned.

CROSS-REFERENCE TO RELATED APPLICATIONS

The invention described and claimed herein is related to my copending patent application, Ser. No. 920,674, filed June 30, 1978 for a "VALVE OPERATING SYSTEM", now U.S. Pat. No. 4,240,304. The copending application describes an operating system in which a plurality of manually operable hydraulic valves are selectively coupled by solenoid to powered actuators for remote operation. The valve system of the copending application is particularly useful for use with the present remote control system and is briefly described herein for use with the preferred embodiment of this invention.

BRIEF SUMMARY OF THE INVENTION

This invention relates to remote control systems and particularly to a system in which heavy machinery controls, such as hydraulic valves, electric drive motors, or the like, may be accurately controlled via a fiber optic link that may be several hundred meters in length.

Remote control systems employing fiber optic links are particularly valuable for portable operations where accurate and dependable control is required. Unlike the usual electrical cable or radio control link, fiber optics are not affected by external electromagnetic radiation, nor do they radiate a signal that may be dangerous in an explosive atmosphere. In a fiber optic remote control system there is no danger to the remote operator from a poisonous environment at the equipment site nor is there a danger that high voltage may accidentally be transmitted from the site to the operator. Thus, fiber optic linked remote control is most valuable for applications, such as the control of machinery in a mine, operation of a crane handling dangerous loads or in a dangerous environment, or the maintenance of machinery that may contact high voltage potentials.

The fiber optic control system of the present invention is described in connection with a hydraulic valve control system, such as may be found on road construction equipment, cranes or the like. In such equipment, hydraulic pumps generate high hydraulic pressures to a fluid which is selectively valved to appropriate hydraulic actuators, such as hydraulic cylinders with pistons that may exert many tons of linear force to lift or move an object. The hydraulic valves for directing the high pressure fluid into the appropriate actuators are generally manually operated by an operating lever under the control of the operating engineer. In my copending application, Ser. No. 920,674, filed June 30, 1978, a valve control system is described in which the manually operated valve may be coupled, upon actuation of an electrical solenoid, to a motor-driven mechanism that provides to the hydraulic valve the same actuation degree and direction that is provided by manual operation. While the fiber optic remote control system described and claimed herein may be used to control a variety of different types of equipment, it is described herein in connection with the solenoid coupled valve system of my copending application.

Briefly described, the present invention includes a remote control handle unit that may contain various function switches, potentiometers, and a spring-biased deadman switch. The voltages from various selected function switches and the levels from the various potentiometers are converted into digital pulses having various pulse lengths for transmission through the fiber optic link to a receiver that reconverts the digital signals into corresponding analog signals. The reconverted binary signals from the function switches may then be used to operate solenoids or other electrical on-off devices. The voltage levels derived from the remote potentiometers are servoed against the signal levels from equipment mounted position indicating potentiometers to develop error signals that control the polarity and potential for driving motors or the like that will reposition the equipment to the desired location or position.

Many novel safeguards are included. For example, release of the spring-biased remote deadman switch grounds all input data and alters the transmission mode of the fiber optic transmitter. The resulting received signal represents either the released deadman switch, a broken optical fiber link, or a faulty digital transmission through the fiber and instantly shuts down the control system for a predetermined delay period while simultaneously returning all positioning motors to a neutral predetermined point. A similar shutdown and delay occurs if an incorrect function is prematurely selected at the remote handle to thereby prevent an accidental switching of a function. A failure of primary power not only shuts down the system while activating a standby battery that repositions the motors, but also releases a solenoid valve that bypasses high pressure hydraulic fluid into the fluid reservoir.

These and other features and advantages of the system will become apparent from the following drawings, detailed description and claims.

DESCRIPTION OF THE DRAWINGS

In the drawings which illustrate a preferred embodiment of the invention:

FIG. 1 is an overall system block diagram of the fiber optic control used for controlling hydraulic valves;

FIG. 2 is a schematic diagram of the control circuitry contained in the remote handle of FIG. 1;

DETAILED DESCRIPTION

Figure 3:
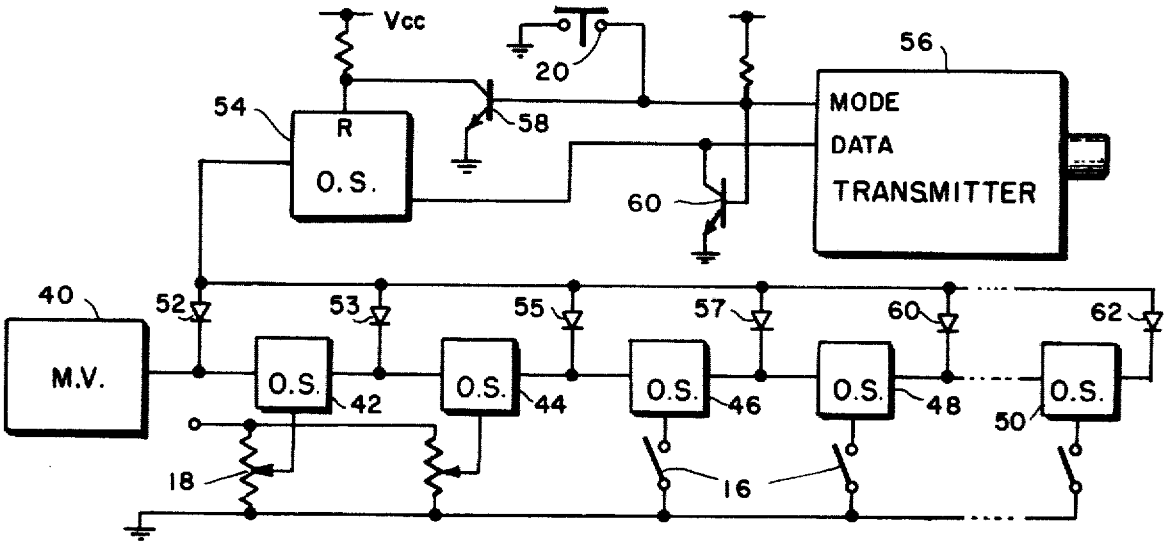
FIG. 3 is a block diagram of the fiber optic transmitter circuitry.

If a truck mounted crane or the like is to be used for handling dangerous loads or is to be operated in undesirable or dangerous environments, or if the crane operator must be located away from the manual hydraulic controls on the crane body in order to accurately operate the crane, a remote operating position is necessary. As previously discussed, a fiber optic remote link is most advantageous because it cannot transmit dangerous electric currents, is impervious to moisture or dangerous gases, and does not radiate electromagnetic signals that could, in certain areas, trigger explosive squibs.

The system of the invention is for a remote control employing a fiber optic link between the apparatus being controlled and the remote location. The system is particularly valuable for remotely controlling the operation of a hydraulic valve system on equipment such as truck cranes or the like and, in the preferred embodiment, it will be described for the remote control of hydraulic valves on a typical truck crane having a lockable truck cab, storage battery supply, hydraulic pressure system, and a truck or crane mounted manually controlled hydraulic valve system that is described and claimed in my copending patent application, Ser. No. 920,674.

Illustrated in the system block diagram of FIG. 1 is a remote control handle 10 having a handle portion 12 and a control section 14. The control section 14, which is illustrated in the schematic diagram of FIG. 2, contains a multiple function selector switch 16 which, for reasons to be described later, is a single pole multi-position break-before-make switch. Control section 14 further contains a motor direction and speed control 18 which, as illustrated in FIG. 2, is a potentiometer coupled between a 12-volt D.C. source and ground reference. The center wiper of potentiometer 18 is spring-biased toward the center of the potentiometer and therefore, until actuated, carries a potential of 6 volts.

The control section 14 also contains a spring-biased normally-open deadman switch 20 positioned in the control handle 10 so that the thumb or finger of the operator may conveniently actuate the switch during remote control operations. As illustrated in FIG. 2, one terminal of the deadman switch 20 is grounded and the opposite terminal is connected to a wire in a cable 22 that leads from the remote handle 10 to the fiber optic transmitter circuitry 24 as shown in FIG. 1.

Transmitter circuitry 24 is physically a small light weight package containing not only the transmitter circuitry but also a 12-volt portable battery pack for powering both the remote handle 10 and the transmitter circuitry. In the preferred embodiment, the entire transmitter circuitry and battery pack will be contained in a housing capable of being easily carried on the operator's belt. The cable 22 would then have a length of about three feet or a length necessary to reach between the belt mounted transmitter circuitry 24 and the remote handle 10. As will be discussed in detail in connection with FIG. 3, the fiber optic transmitter circuitry 24 generates optical pulse signals corresponding to the positions of the selector switch 16 and the potentiometer 18, but will only transmit these optical signals if the deadman switch 20 is closed.

The optical pulse output of the transmitter circuitry 24 then passes through a fiber optic link 26 that may be several hundred yards in length to the fiber optic receiver circuitry 28 which, together with a lockable D.C. supply console 30 that is connected to the truck storage batteries, is contained in the locked truck cab illustrated generally by the dashed box 32 in FIG. 1. The fiber optic receiver circuitry 28 converts the optical pulses generated by the transmitter 24 and received through the optical link 26 into analog signals corresponding to the values set into the control section 14 of the handle 10 and these analog voltage signals are applied to a hydraulic valve and motor control circuit 34.

The control circuitry 34 operates solenoid couplers which interconnect the manually operable hydraulic valve actuators with a motor-driven mechanism that may be driven forward or reversed to lift or lower the manual actuators during the periods they are solenoid coupled. The movement of the motor-driven mechanism in the motor and solenoid coupler section 36 is monitored by a potentiometer similar to the potentiometer 16 in the remote handle 10. Therefore, the hydraulic valve and motor control circuitry 34 compares the positioning of the potentiometer 18 in the handle 10 with the monitored potentiometer associated with the valve drive motor and positions the valve drive motor accordingly.

Many safeguards are associated with the system and are contained in the hydraulic valve and motor control circuitry 34. For example, if the truck storage battery ceases to function so that all power is lost, the motor control circuitry 34 releases a normally-open solenoid valve 38 to permit high pressure hydraulic fluid in the system to rapidly return to the fluid reservoir to thereby cease all further hydraulic operations. An inadvertent release of the deadman switch 20 in handle 10 will automatically stop all operations and return the valve drive motor to its neutral position irrespective of the positioning of the potentiometer 18 in handle 10. Provisions are included in the motor control circuitry 34 for similarly stopping all further operation in the event that the selector switch 16 is switched before the valve drive motor is returned to its neutral position and there is an automatic built-in delay of two to three seconds before the control system can again be started. Another safeguard is the including of a standby battery pack within the hydraulic valve and motor control circuitry. In the event of a truck power failure, the standby battery will automatically return the valve drive motor to a neutral position and will not respond to any further remote control until the truck power has been restored.

FIG. 3 is a block diagram of the fiber optic transmitter circuitry 24 of FIG. 1. The transmitter circuitry includes a multivibrator 40 having a period of approximately 30 msec that initiates a chain of cascaded one-shots 42–50 whose pulse lengths are determined by control voltages. Typically, one-shots 42–50 may be type 555 timers having their control voltage terminals (pin 5) coupled to either the wiper contact of potentiometer 18 of FIG. 1 or to a contact of the function selector switch 16. If the potentiometer 18 is used to generate the control voltage to the one-shot 42, the output pulse width will vary between approximately 500 to 2500 usec. according to the setting of the potentiometer 18. Since switches 16 are associated with one-shots 46–48, two discrete pulse widths will be selectively generated therefrom. One-shot 50 is connected directly to ground and produces a fixed length pulse, the purpose of which will be explained later.

As each of the one-shots 42–50 are progressively triggered by the initial action of multivibrator 40, the output signals pass through diodes 52–62 to the trigger input terminal of a one-shot 54 having a period of approximately 100 usec. As the one-shot 54 is triggered, it forms narrow 100 usec. pulses that vary in position between 500 and 2500 usec. to form fixed frame pulse position modulation of the analog signals. The output from one-shot 54 is then applied to the data input terminal of a commercially available fiber optics transmitter 56, such as the Model HFBR-1001 fiber optic transmitter manufactured and marketed by Hewlett-Packard Company of Palo Alto, Calif.

The Hewlett-Packard Model HFBR-1001 fiber optic transmitter has two operational modes. If an input signal to the transmitter mode terminal is at ground potential, or low, the internal circuitry of the transmitter generates the necessary optical code to transmit the input data to the distant receiver where it is decoded to precisely conform to the transmitter input data. If, on the other hand, the transmitter mode input is high, internal coding is not provided and there are no transmitter optical output signals.

Coupled to the mode input terminal of transmitter 56 of FIG. 3 is one contact of the normally open deadman switch 20, the other contact of which is grounded. Therefore, when the operator depresses, or closes, the deadman switch 20, transmitter 56 goes into its low input mode in which it internally codes the input data for transmission to the receiver. The mode input terminal is also connected to the base of transistor 58 which couples the reset terminal one-stroke 54 to ground. Therefore, with a depressed or closed deadman switch 20, transistor 58 is off so that one-stroke 54 may operate and be reset in a normal manner.

If the operator releases deadman switch 20, the mode input terminal of the transmitter 56 is lifted above ground to its high state in which no transmitter input data is transmitted. The mode input terminal of the transmitter is connected to the base of a transmitter 60 coupled between the data input terminal and ground so that when the mode input goes to its high state, transistor 60 becomes conductive to ground all input data. Simultaneously, transistor 58 now becomes conductive to ground the reset terminal one-stroke 54. The result is that no data enters transmitter 56 and since the transmitter is in its high uncoded mode, no optical data will be transmitted therefrom.

Figure 4:
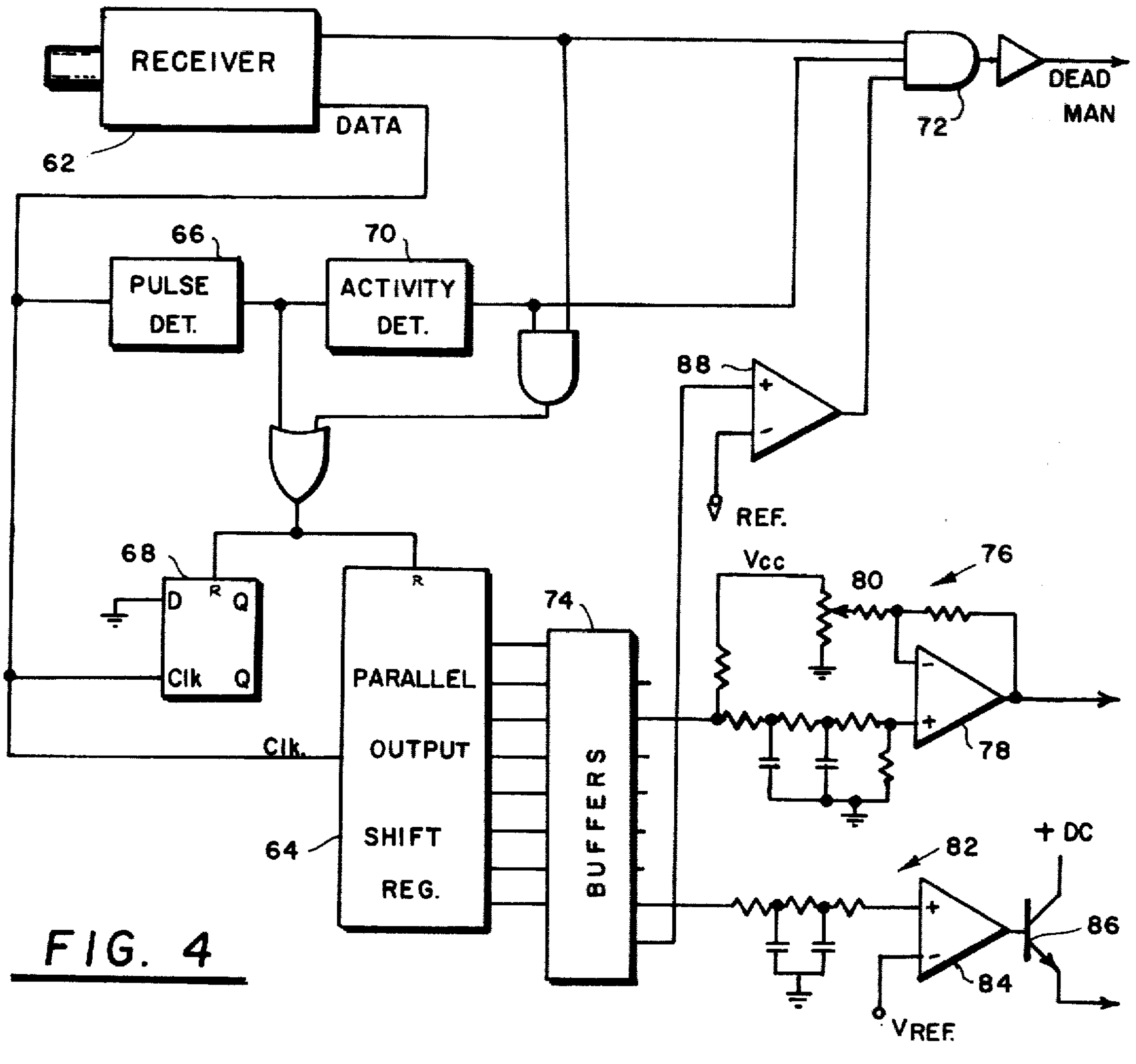
FIG. 4 is a block diagram of the fiber optic receiver circuitry.

FIG. 4 is a block diagram of the fiber optic receiver circuitry of FIG. 1 and preferably includes the Hewlett-Packard Model HFBR-2001 fiber optic receiver 62. This type of receiver has an output terminal from which digital data is produced and a second or link monitor terminal that provides a signal indicating link continuity. Thus, a link monitor output signal indicates that the optical signal path has been interrupted by, for example, broken cable, dirty connector, or a grounded input signal such as provided upon release of the deadman switch 20.

The pulse position modulation data output from the receiver 62 is applied to a sync detecting retriggerable one-shot pulse detector 66 and to the clock input terminals of a D-type flip-flop 68 and a parallel output shift register 64 which may be a type 74LS164. The output of the pulse detector 66 resets the register 64 and also the flip-flop 68. Flip-flop 68 has a grounded D-input to generate, upon reset, a "one" output which is applied to the register 64 and which is propagated into successive stages of the register 64 for time periods corresponding to the clocked-in pulse position modulation data originally determined by the one-shots 42–50 in the transmitter circuitry of FIG. 3. A time gap between the last pulse of one-shot 54 of FIG. 3 and the next initiating pulse of multivibrator 40 is detected by the pulse detector 66 of FIG. 4 which then resets the shift register 64 and also resets the "one" generating flip-flop 68.

The output of the pulse detector 66 is coupled to the input of a sync activity detector 70 which may be a D-type flip-flop. Activity detector 70 will detect if two or more sync pulses in series are missing from the data output train and will apply an output signal to an OR-gate 72. A second input to OR-gate 72 is derived from the output signal of the link monitor terminal of the receiver 62.

The parallel output from shift register 64 is triggered in parallel into buffers 74 and thence into digital-to-analog circuits corresponding in number to the capacity of the shift register 64 and/or the mechanical functions to be controlled. Illustrated in FIG. 4 are only two output converter circuits coupled to the output of the buffers 74. The converter circuit 76 develops an analog output voltage of 6 volts $\pm 5$ volts representing the period the binary "one" remained in the corresponding stage of the register 64 and hence the position of a potentiometer such as the motor control potentiometer 18 of FIGS. 1 and 2. The output of the buffer 74 to the circuit 76 includes a resistance-capacitance filter circuit applied to the non-inverting input terminal of an operational amplifier 78 such as the type LM358. The output of amplifier 78 is coupled through a feedback resistance to its inverting terminal and also through a resistance to the wiper arm of an offset potentiometer 80 coupled between positive potential and ground. In operation, potentiometer 80 should be initially adjusted so that the output voltage of the amplifier 78 is at its mid-value of 6.0 volts, the same mid-point value of the remote control potentiometer 16 of FIGS. 1 and 2.

Other outputs of the buffer 74 may be applied to other variable voltage circuits such as circuit 76 or may be applied to analog switching circuits such as the circuit 82. The buffer output signal is applied through suitable resistance-capacitance filtering to the non-inverting input terminal of the amplifier 84, the inverting input terminal of which is coupled to a reference voltage having a value of about 250 mv, or that which will produce an on or off output control signal to the base of the output power transistor 86.

The last output terminal of the buffer 74 provides a signal originating from the fixed period one-shot 50 of FIG. 3 and is used to provide another input signal to the deadman OR-gate 72. This last channel is decoded by an amplifier 88 and if for any reason the circuitry fails to detect this last channel, its signal, together with the link monitor signal, and the output of the activity detector 70 will produce an output deadman voltage to the subsequent circuitry.

Figure 5:
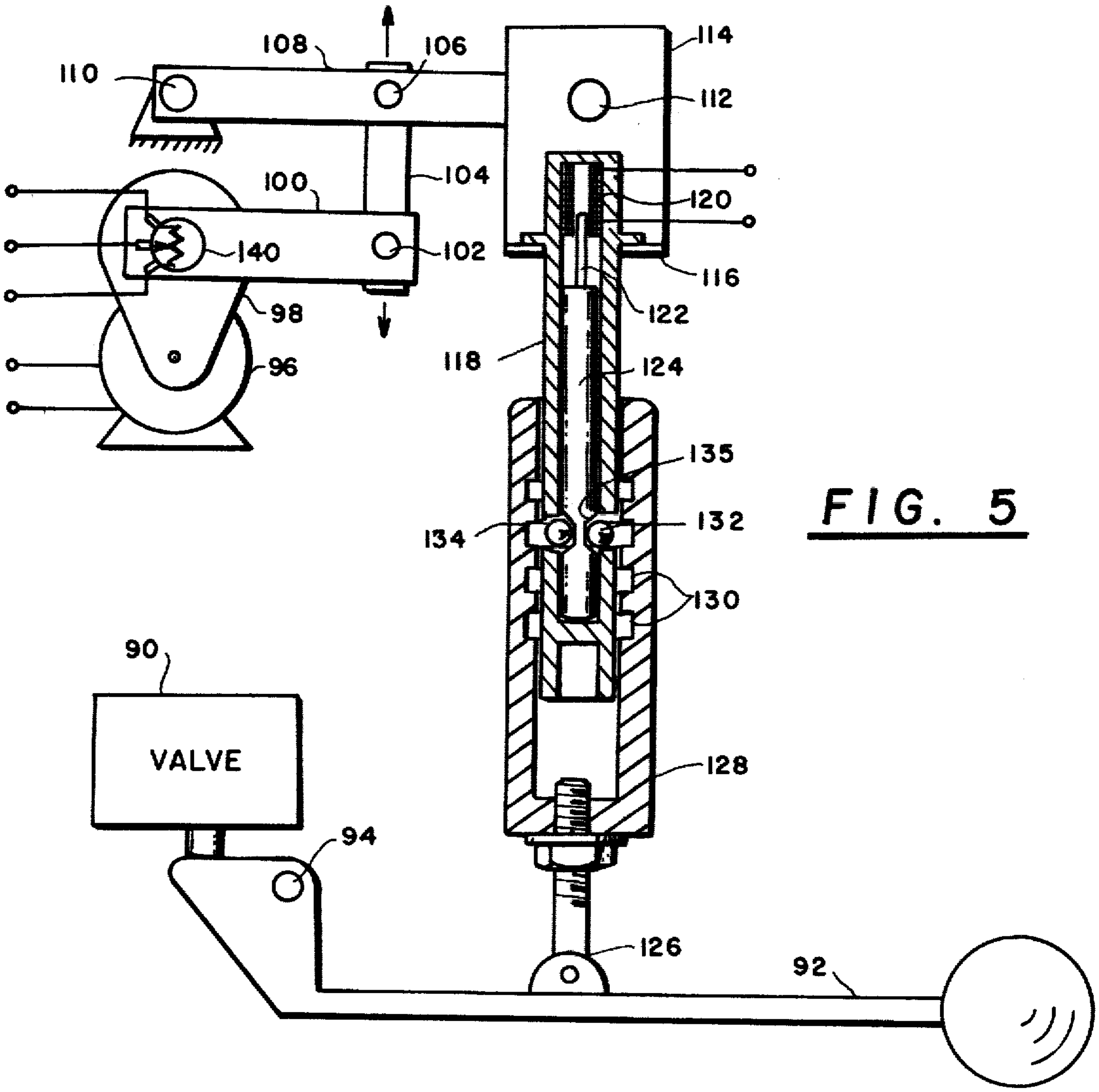
FIG. 5 is a simplified sectional elevation view of one of a plurality of prior art hydraulic valves to be remotely actuated by the control system.

At this point, a brief description of the prior art valve drive motor and solenoid coupler of FIG. 5 should be presented. As previously mentioned, the material included in FIG. 5 is fully described and claimed in my copending patent application Ser. No. 920,674 and is presented here to illustrate a control mechanism to which the present remote controlling system is particularly adapted. In FIG. 5, a conventional hydraulic valve 90 is manually operable by a control handle 92 rotatably mounted to the pivot 94 for operation of the valve. A D.C. motor 96 is coupled via a speed reducing gear box 98 to an output shaft (not illustrated) which is attached via a friction clutch to a cross arm 100. Thus, rotation of motor 96 will tend to drive the cross arm 100 either up or down depending upon the polarity of the intput power. Arm 100 is pivoted at 102 to a vertical link 104 which is pivoted at 106 to horizontal member 108. One end of member 108 is pivoted to a stationary frame at 110 and the opposite end is coupled to an elongated horizontal shaft which is moved up or down by rotation of motor 96. Pivoted to shaft 112 is an L-shaped bracket 114 having on the horizontal lip 116 a tubular input shaft 118. A solenoid 120 mounted at the top end of input shaft 118 actuates an iron core 122 connected to a shaft 124 that is movable within the hollow bore of the input shaft 118. Coupled to the control handle 92 by an appropriate clevis 126 is a tubular output shaft 128 having a bore of sufficient diameter to loosely mate with the exterior walls of the input shaft 118.

Annular detent rings 130 cut in the interior walls of the output shaft 128 are aligned to engage spherical balls 132 which lie in apertures 134 in the wall of the input shaft 118 and which are forced through the apertures 134 into the detents 130 by operation of the solenoid 120 which pulls up the shaft 124 to force the balls 132 from annular recesses 135 in the shaft 124. Thus, the balls form a connection between the input shaft 118 and the output shaft 128 whereby operation of the motor 96 will lift the input shaft 118 and therefore the output shaft 128 and the hydraulic actuator handle 92. Upon release of current in the solenoid 120, the shaft 124 will drop within the input shaft 118 so that the balls 132 may again fall back into the recesses 135 in the shaft 124 to release the input shaft 118 from the detents 130 in the output shaft 128 whereby the output shaft returns to its normal neutral position.

It should be noted that the above represents only an explanation of the simplified construction and operation of the valve drive motor, and only one solenoid coupler is described. In practice, one drive motor 96 is employed to provide vertical movement in the elongated horizontal shaft 112 and several valve actuators are coupled thereto, each separately operable by appropriate selection of the remote function switch 16 of FIGS. 1 and 2. If operation of the equipment requires simultaneous operation of more than one function at one time, then additional motor drive systems such as illustrated in FIG. 5 will be required and a corresponding number of potentiometers 18 must be added to the remote control handle 10 of FIGS. 1 and 2.

In FIG. 5, the rotational position of the cross arm 100 and hence the position of the input shaft 118 is monitored by a potentiometer 140 coupled to the output shaft of the gear reducer 98. Potentiometer 140 is coupled between a 12-volt D.C. source and ground potential provided by the hydraulic valve and motor control circuitry 34 and the center arm of potentiometer 140 accurately transmits a voltage representing the shaft position or vertical movement of the input shaft 118 to the circuitry 34.

Figure 6:
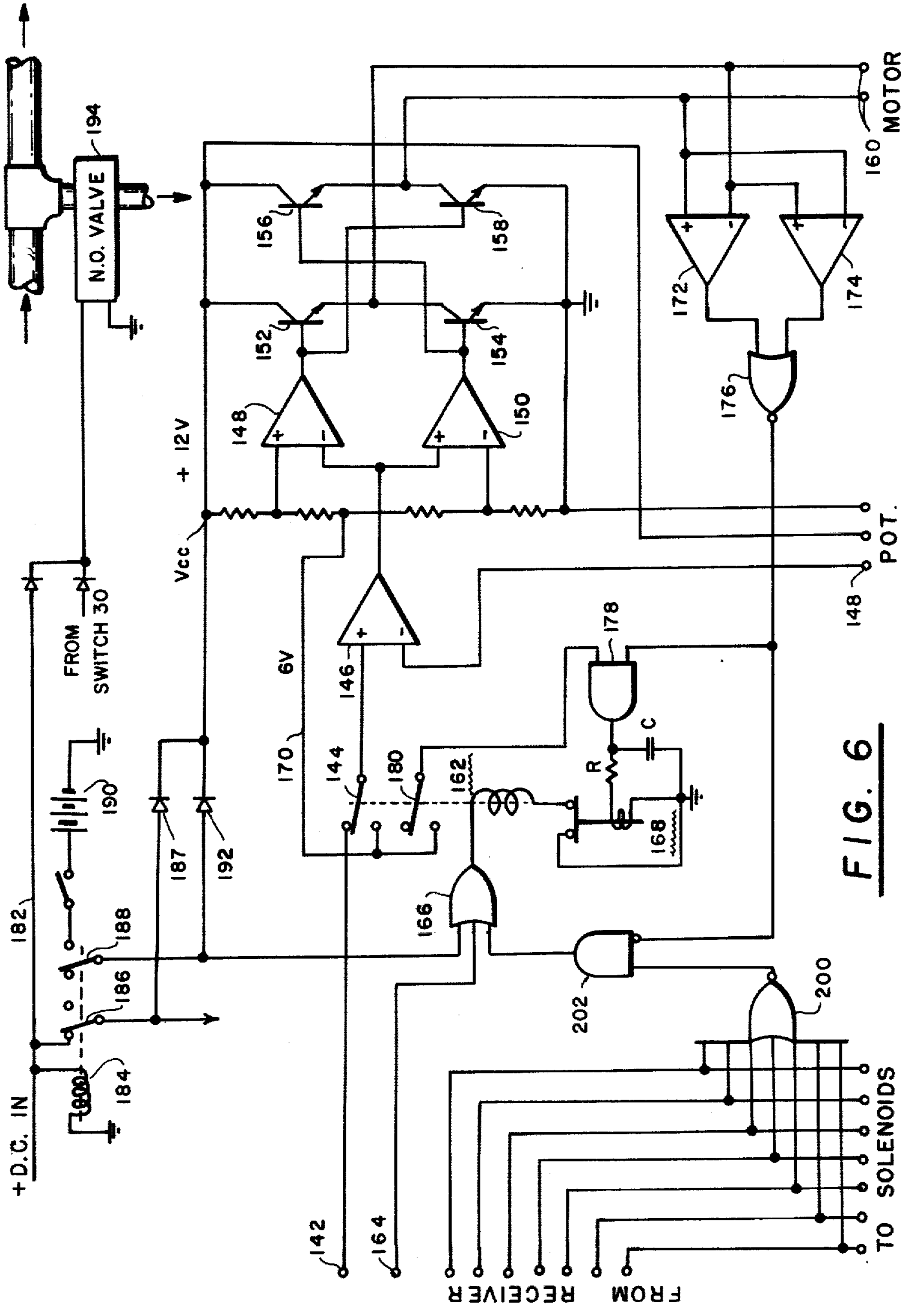
FIG. 6 is a block diagram of the hydraulic valve and motor control circuitry of the invention.

The hydraulic valve and motor control circuitry 34 of FIG. 1 is illustrated in the schematic diagram of FIG. 6. The circuitry of FIG. 6 receives input signals from the fiber optic receiver circuitry 28, D.C. power from the truck supply through lockable switch 30 of FIG. 1, and the input signal from the center arm of the shaft potentiometer 140 of FIG. 5. This input from potentiometer 140 is servoed against the analog input signal originally derived from the motor direction and speed potentiometer 18 of FIG. 1. The analog signal representing motor direction and position and derived from the remote control is received from the receiver circuitry at input terminal 142 of FIG. 6 and is transmitted through normally closed relay contacts 144 to the non-inverting input terminal of a comparator 146. The D.C. signal derived from the center arm of the potentiometer 140 of FIG. 5 is received at input terminal 148 and is transmitted to the inverting terminal of the comparator 146. The output of the comparator is applied to the inverting terminal of operational amplifier 149 and to the non-inverting terminal of a similar amplifier 150. The opposite input terminals of amplifiers 149 and 150 are suitably biased by a voltage divider coupled between 12 volts and ground potential. Also coupled between 12 volts and ground potential are NPN switching transistors 152 and 154 in series and transistors 156 and 158 in series. The output terminal of amplifier 149 is coupled to the base of transistor 152 and to the base of transistor 158. The output terminal of amplifier 150 is coupled to the base of transistors 154 and 156. One output conductor to the motor terminals 160 is coupled to the interconnection of the emitter of transistor 152 and collector of transistor 154. The second motor conductor is connected to the interconnection of the emitter of transistor 156 and collector of transistor 158.

If the input signals to the comparator 146 are identical, the output signals from amplifiers 149 and 150 will be zero and all transistors 152–158 will be off to produce a zero potential across the motor terminals 160. Whenever there is a difference at the input terminals of the comparator 146, there will be a corresponding difference in outputs of amplifiers 149 and 150, one being positive and the other negative. If amplifier 149 generates a positive output, transistors 152 and 158 will conduct and a 12-volt potential will pass through transistor 158 to the corresponding motor terminal 160. Similarly, since transistor 158 is also conducting, its collector is at ground potential and the corresponding potential is applied to the opposite motor terminal 160. It can be seen, therefore, that the analog voltage inputs at input terminals 142 and 148 will control the polarity and voltage to the motor 96 of FIG. 5.

Relay 162 which includes contacts 144, operates to provide circuit safety features as previously discussed. If, for example, a signal is received at the deadman input terminal 164, it will pass through the OR-gate 166 to the excitation coil of the relay 162, and thence through normally closed contacts of the relay 168 to ground potential. The resulting current through the coil of relay 162 will open the contacts 144 to prevent the analog signal appearing at input terminal 142 from reaching the comparator 146. The opening of the contacts of the relay 162 also applies a current through the contacts 180 to the relay excitation coil to lock the relay 162 in its excited position. A conductor 170 coupled to the mid-point of a resistance voltage divider between the 12-volt and ground potentials, and therefore at a level of 6 volts, is coupled to the alternate, or excited terminal of contacts 144 and also to the excited terminal of the contact 180. Thus, whenever the coil of relay 162 is energized, a 6-volt signal is applied to the non-inverting terminal of the comparator 146 to thereby produce a required voltage at the motor terminals 160 that will return the motor 96 to its neutral position, at which point the monitor potentiometer 140 of FIG. 5 will be centered to produce a corresponding 6-volt output signal.

Motor terminals 160 are connected to both the inverting and non-inverting input terminals of amplifiers 172 and 174, the output terminals of which are coupled to the input of a NOR-gate 176. Amplifiers 172 and 174 and the NOR-gate 176 comprise a zero motor voltage detector circuit so that, with no potential across motor terminals 160, the output signals from amplifiers 172 and 174 will be zero and the output of NOR-gate 176 will be high. The output of the NOR-gate 176 is applied as one input to the AND-gate 178, the second input of which is obtained from the contact 180 of the relay 162. Thus, when relay 162 is activated, the terminal 180 is connected to the conductor 170 carrying six volts. Therefore, AND-gate 178, receiving both the high output from NOR-gate 176 and the 6-volt output through contacts 180, produces an output signal through an RC delay network which will, after a predetermined time of two to three seconds, open the contacts of the relay 168 to break the current flow through the coil of relay 162 and permit the contacts to return to their normal position. It will be noted, therefore, that any output potential across the motor terminals 160 will cause the NOR-gate 176 to produce a low output and a corresponding low output of the AND-gate 178, hence relay 162 will remain activated for a period of two to three seconds after the motor terminals 160 have finally acquired an equal potential.

D.C. power input to the circuitry of FIG. 6 is received from the truck mounted power console 30 on the 12-volt power conductor 182. Coupled between conductor 182 and ground potential is a relay coil 184 which actuates relay contacts 186 and 188. Normally open contacts 186 are connected between conductor 182 and through an isolation diode 187 to the circuit $V_{cc}$ conductor so that when the coil 184 is excited by an input potential on conductor 182, a 12-volt potential is applied to the circuitry of FIG. 6. In the event of a power failure, coil 184 is released and the relay contacts 188 now connect the standby power pack 190 through an insolation diode 192 to the circuitry of FIG. 6. When power is lost on conductor 182 and standby power is applied to the circuitry, the standby voltage is also applied as one input to the OR-gate 166 to thereby open the relay 162 in a manner similar to a deadman input signal at input terminal 164. The standby power from battery 190 through diode 192 into the circuitry provides sufficient power to operate the hydraulic valve and motor control circuitry 34 and to provide adequate power to return the motor 96 of FIG. 5 to its neutral position. The isolation diodes 187 and 192, however, prevent standby power from returning to the fiber optic receiver circuitry or from other power consuming equipment associated with the truck crane.

Conductor 182 is also connected to a solenoid of a hydraulic valve 194 preferably connected between the hydraulic pump output, or primary pressure lines and the low pressure hydraulic reservoir. Loss of input power on conductor 182 will release all high pressure hydraulic fluid from the system by releasing the excitation current from a normally-open solenoid operated valve 194 which, while closed by the activated solenoid, prevents the high pressure fluid from returning to the hydraulic fluid reservoir.

Solenoid switching signals received from the fiber optic receiver circuitry of FIG. 4 pass directly through the control circuitry to the corresponding solenoid couplers described in FIG. 5. Each of the solenoid signal lines passing from the receiver to the solenoids of FIG. 5 is tapped in the control circuitry of FIG. 6 and the tap is applied to the input terminals of a NOR-gate 200, the output of which is applied to the input of an AND-gate 202. The second input terminal to AND-gate 202 is received, inverted, from the output of the NOR-gate 176 which produces a high output only when there is no motor potential at terminals 160.

As previously mentioned in connection with FIG. 2, the multi-function selector switch 16 is a break-before-make switch so that any rotation of the selector switch will produce a break or a zero output. This break is sensed by the NOR-gate 200 of FIG. 6 and produces a high output to the input of AND-gate 202. If there is a potential across the motor terminals 160, NOR-gate 176 produces a low output which, after inversion, becomes a high input to AND-gate 202. Thus, a motor potential across terminals 160, together with the high output form NOR-gate 200, causes AND-gate 202 to produce a high output to activate relay 162. However, if the motor is neutralized and no potential appears across motor terminals 160, NOR-gate 176 produces a low input to AND-gate 202 to produce a low output into the OR-gate 166. It follows, therefore, that no changes may be made in the multi-function selector switch 16 before the motor 96 of FIG. 5 has returned to its neutral position and it is therefore impossible to accidentally change a function that may cause a crane or similar apparatus to attempt conflicting functions.

The fiber optic remote control system of the invention will therefore accurately position hydraulic actuators, one at a time, in accordance with the command of the remote operator. It will be appreciated that any number of motors may be controlled by the circuitry of the invention and that the binary signals which have been described in connection with solenoid actuators may be used for other purposes, such as the control of remote switches or alarms, or the like.

Having thus described my invention, what is claimed is:

1. A fiber optic linked remote control system for transmitting electrical analog data signals from a remote control unit via a fiber optic link to receiving means located at the equipment to be controlled, said remote control system including:

a remote control station having a manual control section containing function selecting means, output voltage varying means, and a spring-biased deadman switch;

fiber optic transmitting circuitry coupled to said remote control station, said transmitting circuitry including modulating means for converting analog signals representing functions selected by said selecting means and voltage levels selected by said voltage varying means into a corresponding series of optical data output pulses, said transmitting circuitry further including deadman circuitry responsive to a release of said spring-biased deadman switch for canceling the output of said modulating means;

a fiber optic link, the first end of said link being coupled to the output of said transmitting circuitry;

fiber optic receiving circuitry coupled to the second end of said fiber optic link, said receiving circuitry including demodulating means for reconverting the optical data output pulses of said transmitting modulation means into corresponding analog signals representing functions selected by said remote station function selecting means and said output voltage varying means; and safety circuitry within said receiving circuitry and becoming activated by the canceled optical output of said transmitting circuitry produced by operation of said deadman circuitry or breaking, within said receiving circuitry, the circuitry of said analog signal corresponding to the varying output voltage selected at said remote station, and for delaying for a predetermined delay period the restoration of said varying voltage circuitry after inactivation of said deadman circuitry and corresponding restoration of said transmitting circuitry optical output.

2. The remote control system claimed in claim 1 wherein said safety circuitry is further activated by a broken fiber optic link.

3. The remote control system claimed in claim 1 wherein said receiving circuitry includes servo circuitry for comparing an analog position indicating signal received from external apparatus with said analog signal corresponding to varying output voltage, said servo circuitry generating from the signal comparison error signal an output signal of a polarity necessary to reposition said external apparatus to a position whereby said comparison error signal is canceled.

4. The remote control system claimed in claim 3 wherein said external apparatus is an electrical positioning motor having a neutral position corresponding to a neutral positioning of said remote control station output voltage varying means, said receiving circuitry including means for repositioning said motor to said neutral position, irrespective of the positioning of said remote control voltage varying means, upon activation of said safety circuitry.

5. The remote control system claimed in claim 4 wherein said receiving circuitry includes circuitry responsive to an input power failure for engaging an associated standby power source, for activating said safety circuitry, and for repositioning said motor to said neutral position.

6. The remote control system claimed in claim 5 wherein said receiving circuitry includes function monitoring circuitry coupled to function signal conductors carrying each of said demodulated analog signals representing functions selected by said remote station function selecting means, said monitoring circuitry including means for monitoring the motor output signal of said servo circuitry and for activating said safety circuitry when the selection of said remote station function selecting means is altered while said positioning motor is out of its neutral position.

7. The remote control system claimed in claim 6 wherein said external apparatus includes a manually activated mechanism coupled by the excitation of a solenoid operated coupler to said positioning motor, the solenoid of said coupler being coupled to one of said receiving circuit function signal conductors in said receiving circuitry and responsive to a demodulated analog system therein for operation of said mechanism by said positioning motor.

8. The remote control system claimed in claim 7 wherein said manually actuated mechanism is a hydraulic control valve, and wherein said receiving circuitry includes circuitry responsive to an input power failure for opening an external hydraulic bypass valve coupled between a pressurized hydraulic line and a low pressure reservoir.

9. The remote control system claimed in claim 7 wherein said manually actuated mechanism includes a plurality of hydraulic control valves, each valve in said plurality having a solenoid operated coupler for interconnecting its control valve to a movable valve operating mechanism, said positioning motor being coupled to said valve operating mechanism for providing movement thereto.

* * * * *